United States Patent
Choiniere et al.

(10) Patent No.: US 10,775,143 B2
(45) Date of Patent: *Sep. 15, 2020

(54) ESTABLISHING A TIME ZERO FOR TIME DELAY DETONATION

(71) Applicant: BAE SYSTEMS Information and Electronic Systems Integration Inc., Nashua, NH (US)

(72) Inventors: Michael J. Choiniere, Merrimack, NH (US); Bruce Winker, Weaverville, NC (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 147 days.

This patent is subject to a terminal disclaimer.

(21) Appl. No.: 16/123,358

(22) Filed: Sep. 6, 2018

(65) Prior Publication Data

US 2020/0081025 A1   Mar. 12, 2020

(51) Int. Cl.
| | |
|---|---|
| *F41G 7/22* | (2006.01) |
| *F42C 13/02* | (2006.01) |
| *F42C 11/06* | (2006.01) |
| *F42C 13/04* | (2006.01) |
| *F42B 30/00* | (2006.01) |
| *F42B 12/36* | (2006.01) |
| *G01P 3/68* | (2006.01) |

(52) U.S. Cl.
CPC ............ *F42C 13/02* (2013.01); *F41G 7/2266* (2013.01); *F41G 7/2286* (2013.01); *F41G 7/2293* (2013.01); *F42B 12/365* (2013.01); *F42B 30/006* (2013.01); *F42C 11/065* (2013.01); *F42C 13/023* (2013.01); *F42C 13/04* (2013.01); *G01P 3/685* (2013.01)

(58) Field of Classification Search
CPC ........ F42B 12/365; F42B 15/00; F42B 15/01; F42B 30/00; F42B 30/006; F42B 30/08; F42C 13/02; F42C 13/023; F42C 11/06; F42C 11/065; F42C 13/04; F41G 7/22; F41G 7/226; F41G 7/2266; F41G 7/2286; F41G 7/2293
USPC ........................................................ 102/213
See application file for complete search history.

(56) References Cited

U.S. PATENT DOCUMENTS

| | | | | |
|---|---|---|---|---|
| 4,611,912 A | * | 9/1986 | Falk .................. | G01S 17/58 356/5.09 |
| 4,733,609 A | * | 3/1988 | Goodwin ............. | F42C 13/023 102/213 |
| 4,859,054 A | * | 8/1989 | Harrison ............. | G01S 17/18 356/5.06 |
| 5,669,581 A | * | 9/1997 | Ringer ................ | F41G 7/222 244/3.16 |

(Continued)

*Primary Examiner* — James S Bergin
(74) *Attorney, Agent, or Firm* — Davis & Bujold, PLLC; Scott J. Asmus

(57) ABSTRACT

The system and method for accurately determining range-to-go for a time-delayed command detonation of a projectile. Using dual laser and/or radio frequency detectors on the tail and on the nose of a spinning projectile to determine the range-to-go, time-to-go, and/or lateral offset from the projectile to the target. A time to detonation clock is used to determine when a projectile transitions from an exterior to an interior of a structure such that the projectile can more accurately detonate within a fixed structure.

15 Claims, 5 Drawing Sheets

(56) References Cited

U.S. PATENT DOCUMENTS

| | | | | |
|---|---|---|---|---|
| 5,685,504 | A * | 11/1997 | Schneider | F41G 7/303 244/3.11 |
| 5,835,204 | A * | 11/1998 | Urbach | G01S 17/89 356/5.01 |
| 6,060,703 | A * | 5/2000 | Andressen | F41G 7/008 250/203.6 |
| 7,533,849 | B2 | 5/2009 | Zemany et al. | |
| 7,999,212 | B1 | 8/2011 | Thiesen et al. | |
| 8,450,668 | B2 | 5/2013 | Maynard et al. | |
| 8,502,127 | B2 * | 8/2013 | McNeish | F42B 15/01 244/3.1 |
| 9,683,814 | B2 | 6/2017 | Dryer | |
| 10,466,024 | B1 * | 11/2019 | Choiniere | F42C 13/023 |
| 10,533,831 | B1 * | 1/2020 | Choiniere | F42C 13/02 |
| 2005/0030219 | A1 * | 2/2005 | Friedrich | F41G 7/226 342/68 |
| 2019/0199945 | A1 * | 6/2019 | Stobie | F41G 7/2273 |
| 2020/0080824 | A1 * | 3/2020 | Choiniere | F41G 7/2286 |
| 2020/0080826 | A1 * | 3/2020 | Choiniere | F42C 13/023 |

\* cited by examiner

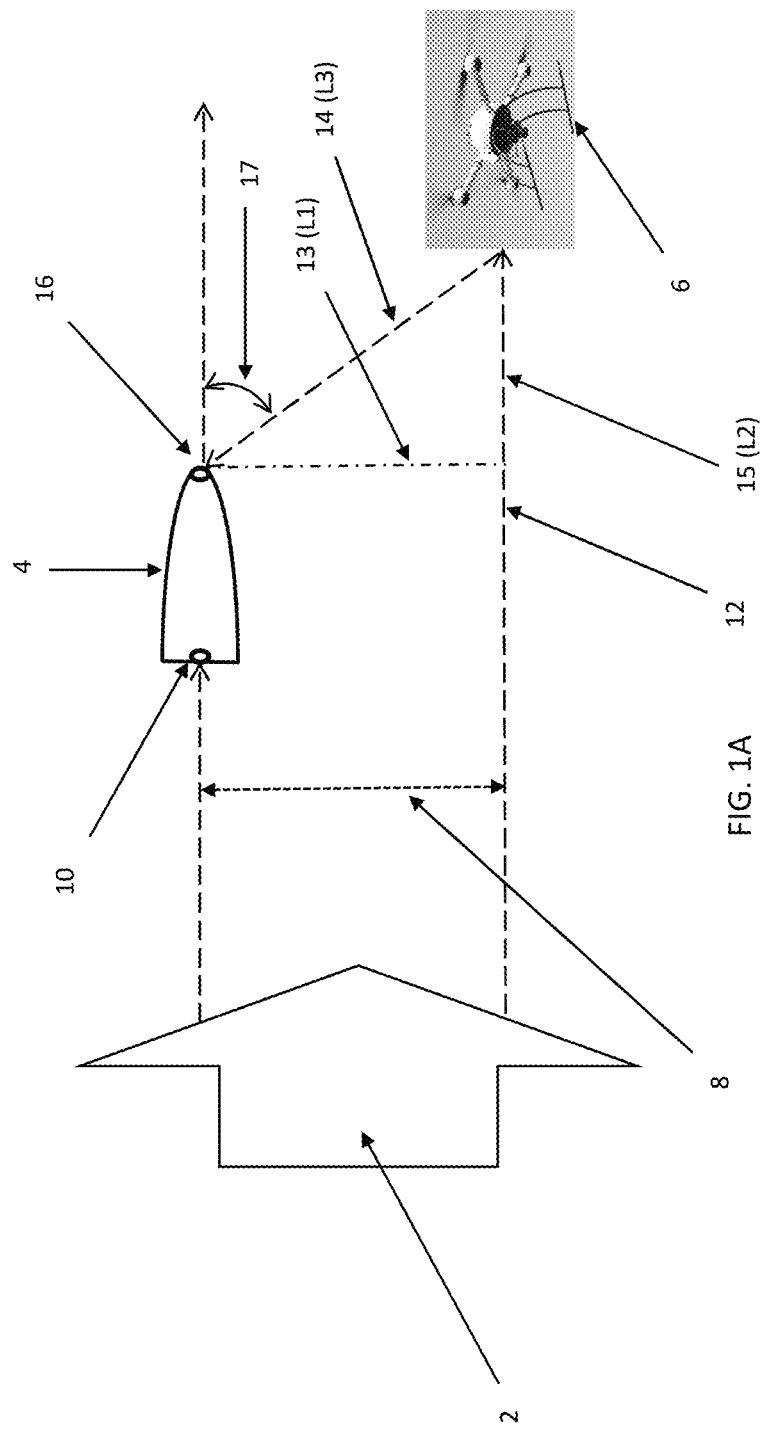

ESTABLISHING A TIME ZERO FOR TIME DELAY DETONATION

FIELD OF THE DISCLOSURE

The present disclosure relates to guided munitions and more particularly to establishing a wall, window, or structure as start time for time delay detonation of a projectile.

BACKGROUND OF THE DISCLOSURE

Precise command detonation maximizes the warhead effects against a target and is highly depended on the "range to go" or "time to go" prior or after impact. Depending on the target and warhead fragment pattern there is an optimum distance in front of the target for soft targets (UAS, aircraft, combatants, etc.). For certain structures, a distance "after" the target, or a delayed detonation, may be useful when flight through an opening such as a window is preferred, for example. In either case, knowing the time accurately has been difficult. Many simple rounds have used spin counters and by knowing the target range and the number of revolutions/meter from the projectile rifling, one can program the round to detonate after a particular spin count. However, these and other techniques rely on knowing the range to extreme accuracy prior to launch and are totally ineffective for moving targets. What is typically lacking is an architecture that measures the "time-to-go" to the actual target and thereby improves accuracy.

Wherefore it is an object of the present disclosure to overcome the above-mentioned shortcomings and drawbacks associated with guided munitions and projectiles.

SUMMARY OF THE DISCLOSURE

One aspect of the present disclosure is a laser illuminator that paints the projectile/weapon and the target area. The weapon has two laser detectors, one facing rear and the other facing forward. The laser pulse that passes by the projectile is detected by the rear facing sensor and starts the range clock. When the laser pulse reflects off the target and is reflected back to the projectile/weapon, the range clock is stopped and the round trip time of the pulse between target and projectile can be converted to distance/range.

In one embodiment of the system of the present disclosure, the system could utilize a very high frequency RF illuminator with a very narrow beam. In some cases, the weapon/projectile could be outfitted with end-fire arrays that can be configured to look forward or rearward to minimize the aperture/antenna count.

Another aspect of the present disclosure is a method for controlling a projectile warhead, comprising: providing a projectile comprising a tail portion and a nose portion; detecting a first signal via a detector mounted on the tail portion of the projectile; determining a first time at which the first signal is detected via the detector mounted on the tail portion of the projectile; detecting a second signal via a detector mounted on the nose portion of the projectile, the second signal being the first signal that has reflected off a fixed target; determining a second time at which the second signal is detected via the detector mounted on the nose portion of the projectile; comparing the first time to the second time to determine a time delay; determining a lateral offset between the projectile and the fixed target using the time delay between detection by the first detector and detection by the second detector; determining when an angle, theta, is approaching perpendicular to the direction of travel of the projectile at a start time ($T_{start}$), wherein the angle represents the detection of a signal by the second detector that has reflected off the fixed target; and providing a time-to-detonate ($T_{det}$) thereby accurately controlling detonation based on a fragmentation pattern for the projectile to occur at some point after the projectile enters an interior of the fixed target.

One embodiment of the method for controlling a projectile warhead is wherein the detector on the tail of the projectile is an electro-optical PIN diode or a radio frequency antenna. In some cases, the detector on the nose of the projectile is an array PIN diode.

Another embodiment of the method for controlling a projectile warhead is wherein a range finding clock is started when the first signal is detected ($T_{zero}$) by the detector on the tail of the projectile and the range finding clock is stopped when the second signal is detected by the detector on the nose of the projectile ($R_{reflected}$), thereby creating a time differential that represents a round trip time between the projectile and the target which can be converted to a range-to-go.

In certain embodiments, a time to detonation clock is started when a signal is detected by the detector on the nose of the projectile at a time ($T_{start}$) when an angle, theta, is approaching perpendicular to the projectile's direction of travel as the signal is reflected of the fixed target.

In yet another embodiment of the method for controlling a projectile warhead, the time to detonation clock is stopped and the projectile is detonated at a time point ($T_{det}$) representing when the projectile is some distance inside the interior of the fixed target. In some cases, the detonation time point ($T_{det}$) determination is dependent on the projectile speed, the type of structure, and the particular projectile. In certain cases, the detonation time point is programmed at the time of launch.

In still yet another embodiment of the method for controlling a projectile warhead, the first signal further comprises a first pulse repetition interval and the second signal further comprises a second pulse repetition interval. In some cases, the lateral offset between the projectile's trajectory and the target's actual position is determined by measuring a time expansion between the first pulse repetition interval and the second pulse repetition interval and convolving the projectile's velocity with the time-to-go thereby improving an accuracy of a detonation.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1A shows one embodiment of the system of the present disclosure.

DETAILED DESCRIPTION OF THE DISCLOSURE

Figure 1B:
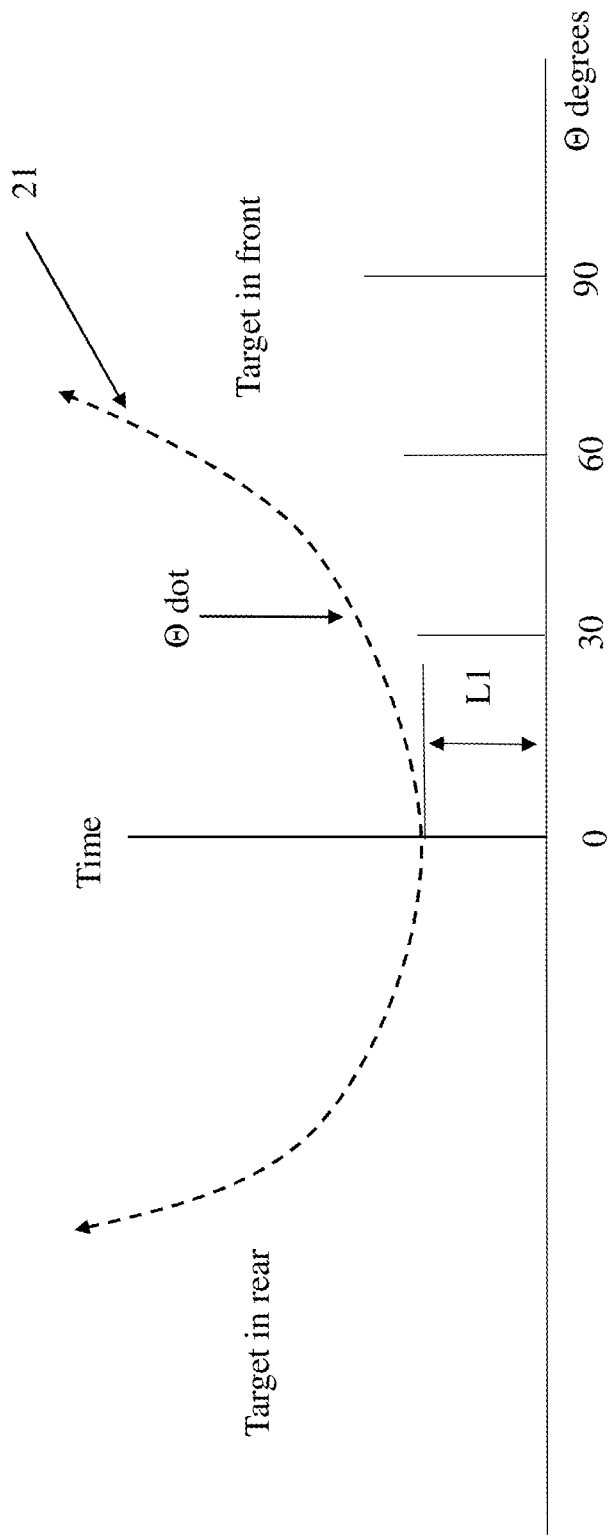
FIG. 1B shows calculations for range-to-go, lateral offset and the like according to the principles of the present disclosure.

One embodiment of the present disclosure is a system for accurately determining the range-to-target distance for a guided munition. In one embodiment, the accuracy is within less than a meter. In some cases, the system utilizes a low energy, short pulse laser (e.g., fiber laser) or radio frequency pulse to paint a target. The short pulse can be 1 to 50 nanoseconds depending on the transmitter. In some cases, the system is low power since the path is one way from the illuminator to the projectile. In certain embodiments, low energy is about 100 µJoules per pulse.

When munitions are laser guided a target is illuminated, or "painted," by a laser target designator on the ground or on an aircraft. One disadvantage of typical laser guided munitions is that in poor weather the system may not be useable because the target illumination cannot be seen, or if the target designator cannot get near the target. In certain embodiments, a laser designator sends a beam in a coded series of pulses so the munition will identify the proper signals, and that way multiple designators can operate in the same region.

In certain embodiments of the system of the present disclosure, the munitions are guided with radio control. In some cases, an aircraft transmits control signals to the munition to guide it to the target. In some cases, the RF or laser signal emanates from a plane or vehicle weapon fire control system. A fire control system guides the weapon to the target using radio frequency (RF), electro-optical (EO), or a combination of the two modalities to illuminate a target during the terminal end game or in the region near the target.

In certain embodiments, the target may be large and fixed, but in other embodiments the target may be a small, moving target or something in between. In one embodiment, the target is an unmanned vehicle, such as a drone. In one embodiment, the target is vehicle, such as an air or land vehicle. In one embodiment, the target is a building or other fixed structure.

In certain embodiments of the system of the present disclosure, a spinning projectile, or munition, is guided to the target from a tracking station. In some cases, a tracking station may be on the ground, such as part of command and control. In some cases, the tracking station may be on a vehicle. In certain embodiments, the munition is guided by a fire control system on the munition launch platform.

In some cases, the munition is spinning at 0.5-2 k revolutions/second. In some cases, the munition is a fly-by projectile that has a directional blast pattern that necessitates accurate detonation in order to hit the target as accurately as possible while mitigating unintended hits or misses. In some embodiments, the blast pattern may be about 1-3 m wide.

In certain embodiments, a fiber laser, or the like, is used to emit radiation to paint the target and/or to track the munition. In some cases, the emitted radiation is used to provide an azimuth (Az) and an elevation (El) bearing for the projectile relative to the target. In some cases, the radiation will hit the back of the projectile and reflect back to the tracking station, or the like. In some cases, the tracking station reports only the Az and El position for the projectile, thus simplifying the EO/RF system used in an embodiment of the present command detonation system.

One aspect of the present disclosure is a system comprising a radio frequency (RF) or laser short energy pulse (10 to 100 ns) that illuminates a projectile's rear sensor and one or more targets. The energy of the short energy pulse is reflected off the target and is received by a second sensor on the nose of the projectile. The first sensor detects the pulse energy as it passes by the projectile, generating a $T_{zero}$ (i.e., the start of a range finding clock). The clock is stopped when the target's reflected energy is detected by the second sensor at $T_{reflected}$. The time differential represents the round trip time between the projectile and the target which can be converted to a range.

In one embodiment of the system of the present disclosure, the system uses the measured RF or laser energy detection from sensor 1 and 2 in a simple limit trip switch approach. When the time-to-go is time<0.005 seconds, or the like, the projectile is signaled to detonate. In certain embodiments, the time chosen is dependent on the projectile speed, warhead ideal detonation distance, and other factors. The "time-to-go" could be a time variable programmed at launch and/or could be negative (e.g., when flying through a window).

Another embodiment of the present disclosure determines the lateral offset between the projectile's trajectory and the target's actual position (i.e., a lateral miss distance). In this embodiment, the projectile's rear sensor(s) determine the projectile's velocity by measuring the time increase between each pulse interval. The time base of each illumination pulse or the pulse repetition interval (PRI) serves as means to measure the time expansion between pulse intervals. If the projectile was not moving, the PRI would match the expected PRI. In one example, for a 40 Hz system, the PRI is 25 milliseconds. If a projectile is at MACH 3 it would travel 25 meters. The 25 meters→81 feet→81 nanosecond (speed of light) increases the PRI time base which can be measured and tracked. By convolving the velocity of the projectile with the "time-to-go" to the target, one can determine the lateral offset, thereby improving/optimizing the accuracy of the detonation.

In certain applications, high kill percentage detonations need to ensure the target is within a kill zone by measuring the actual offset angle to the projectile relative to the threat. The present approach measures that angle. One embodiment of the present disclosure is placing a pin diode on the rear of the projectile and an array on the projectile's forward surface, or nose. By painting the target with a low power, short pulse laser (e.g., a fiber laser), the rear facing detector generates a time zero ($T_0$) and the laser return off the projectile generates the range-to-go and angle between the projectile's centerline and the threat at a second time point ($T_2$). By using range and speed of the projectile, the optimum detection can be realized.

In some cases, the rear facing detector/antenna generates a time zero ($T_0$) as well as Az and El information for the projectile. In certain embodiments, a laser return off the projectile, which is detected by the detector on the face of the projectile at a second time point ($T_2$), generates the range-to-go to the target. This method eliminates the need to determine the range at the tracking station, thus reducing the cost of the scanner and the peak power required for the laser or RADAR used to paint the target.

In some cases, the system also eliminates the complex latency of the tracking system since the projectile acts as its own reference. By using the same laser or RF output, and mounting a pair of receivers on the projectile, the power losses are reduced from $R^4$ and approach $R^2$ losses. In a traditional system where the fire control system uses RADAR or LIDAR to track the projectile and the target, the power losses are in terms or range$^4$ or $R^4$. The energy goes out to both the target(s) and projectile(s) generating $R^2$ losses in the outgoing and the return energy; thereby producing $R^4$ losses. In this embodiment, the one path ($R^2$) reduces the power needed from megawatts to kilowatts or reduces the power needed by the square root of the power needed for a RADAR or LIDAR. It is assumed that this is first order and neglects environmental losses.

Since unmanned aircraft are very small, LIDAR and RADAR are typically ineffective at generating range-to-go for a projectile to the target due to the small signatures of the targets. By tracking them with EO sensors at the fire control system, the azimuth (Az) and elevation (El) of the target can generally be determined. There, range may remain difficult given the weak return signal, but the projectile can still be launched and guided to the target using a version of line of sight (LOS) command guidance. As the projectile approaches the target, the weak signal goes from $R^4$ at the beginning of the flight to $R^2$ prior to target contact. Even a weak signal is detected with the system of the present disclosure since the receiver in now on the projectile.

Referring to FIG. 1A, one embodiment of the disclosure is shown. More specifically, a laser pulse and/or an RF pulse 2 is propagated in the direction of a target 6 and a guided munition 4. The laser pulse and/or RF pulse is used to determine the Az and El of the projectile by detecting reflected signals with sensors located on the projectile. The trajectory error 8 associated with the Az and El data is determined by a Fire Control EO/RF subsystem in certain embodiments. In some cases, the Fire Control subsystem is located on the projectile's launch platform. In certain embodiments, a detector mounted on the rear of the projectile 10 detects the laser pulse and/or RF pulse and establishes a time zero ($T_0$). In some cases, the laser pulse and/or RF pulse is reflected off the target 14 and is detected by a nose-mounted or forward-mounted detector 16 on the munition/projectile at a second time point ($T_2$). In some cases, the forward-facing detector is an array PIN diode.

Still referring to FIG. 1A, determining the time delay between the detection of the radiation signal at the back of the munition 10 and the detection of the reflected radiation signal off the target by a detector mounted about the nose 16, allows a range-to-go to be calculated. This approach also allows the projectile 4 to know its lateral offset from the target. In some embodiments, the lateral offset is determined by the Fire Control system and the time-to-go is determined from the laser/RF pulse. By using the time delay calculated from the differential path 12, an accurate detonation time can be set. In other words, a first signal is detected by the detector mounted on the rear of projectile 10 and a second signal is detected by the detector located on the front of the projectile 16 as the signal is reflected back from the target.

Referring to FIG. 1B, the calculations for range-to-go, lateral offset, and the like according to the principles of the present disclosure are shown. More specifically, a plot of theta, θ, against time is shown. The lateral offset L1 is shown. There is it possible to see that as the projectile (e.g. munition) flies over the target, the distance and thus the time from the munition 21 is asymptotic such that the curve goes from 0° when the projectile is directly over the target and approaches 90° when the projectile is about 20 to 50 meters away from the target, ignoring the length of the munition. At that point, as shown in FIG. 1A, it would be near linear (L2=L3) and L1 would come into play and be a minor contributor. Where sin Θ=L2/L3, Time=L2+L3 (ignoring the weapon length); L3=time/(sin Θ+1) and L2=sin Θ*L3.

In certain embodiments, the front and/or rear detectors are EO PIN diodes. In some cases, the forward looking detector is an RF antenna, an array PIN diode, and/or camera. An RF sensor has the advantage of being all weather, but an RF sensor has the disadvantage of large beams ~2-3° or larger depending on the application. In a UAS swarm environment, RF provides large area coverage for a lower cost than electro-optical (EO) systems. EO systems using a laser or narrow beam illuminators can direct the energy at longer distances to a specific target feature; a wall on a building, a door, a window, etc. It is understood that the spatial control of some weapon systems may gravitate to an EO system for higher precision.

Figure 2:
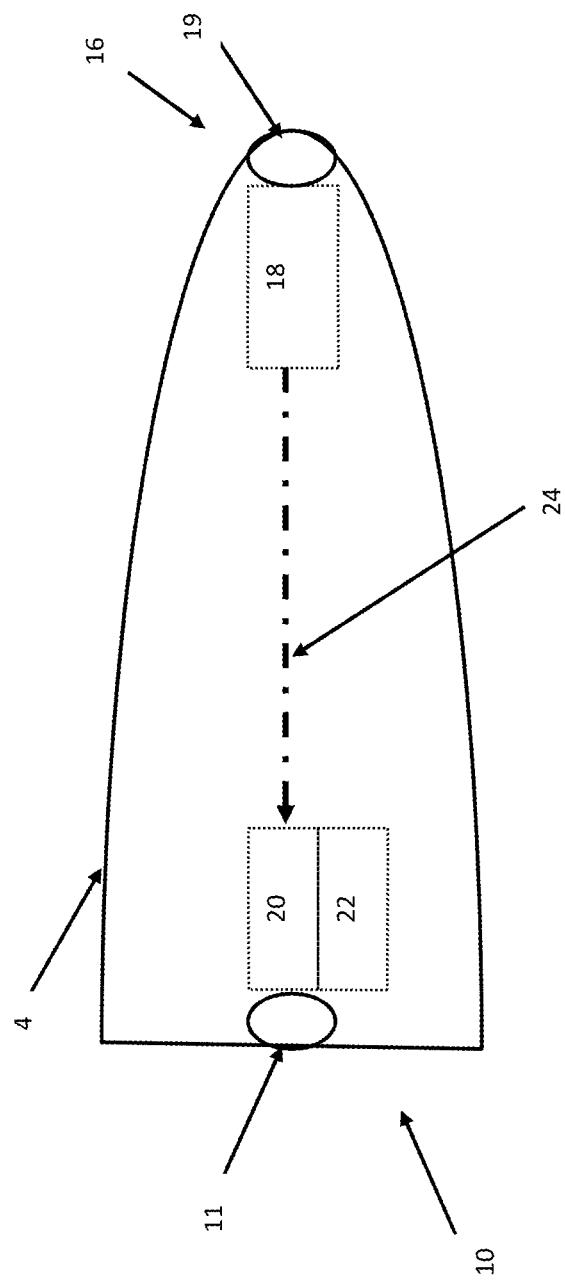
FIG. 2 illustrates two sensors with detector electronics and an associated processor on a munition according to the principles of the present disclosure.

Referring to FIG. 2, the construct of two sensors located on the munition according to the principles of the present disclosure is shown. The munition could be a guided projectile which in one example ranges from a .5 caliber sniper round to a 155 mm artillery shell. The guidance package could be spinning with respect to the ordnance or could be roll stabilized using a bearing between the ordnance the guidance package. In certain embodiments, the guidance package comprises both forward and rear looking sensors for EO/IR or RF energy, a ranging/command detonation processor, a guidance processor, a navigation sensor, and the control actuator system (CAS). In some cases, the time measurements can be accomplished with the elements shown in FIG. 2. More specifically, a front detector 19, may comprise an RF antenna, an EO with one or more lenses, an array PIN diode, a camera, or the like. The front detector 19 in one example is mounted within the front or nose 16 of the projectile 4. In one embodiment the detector 19 is located back from the nose such as mid-body as part of a precision guided kit. Depending upon the application multiple sensors can be utilized. In some cases, the rear detector 11 may be one or more detectors, where the detector is an RF antenna, an EO with one or more lenses, or the like. Similarly, depending upon the application, multiple sensors can be utilized. In certain embodiments, the front detector electronics 18 is in communication 24 with the rear detector electronics 20 and an on-board processor 22. In one example, the communication link may be a cable, a magnetic inductance link, an RF link, an optical link, or the like depending on the round configuration, including, but not limited to spinning, spinning backend—stabilized frontend, and non-rolling airframes.

Figure 3:
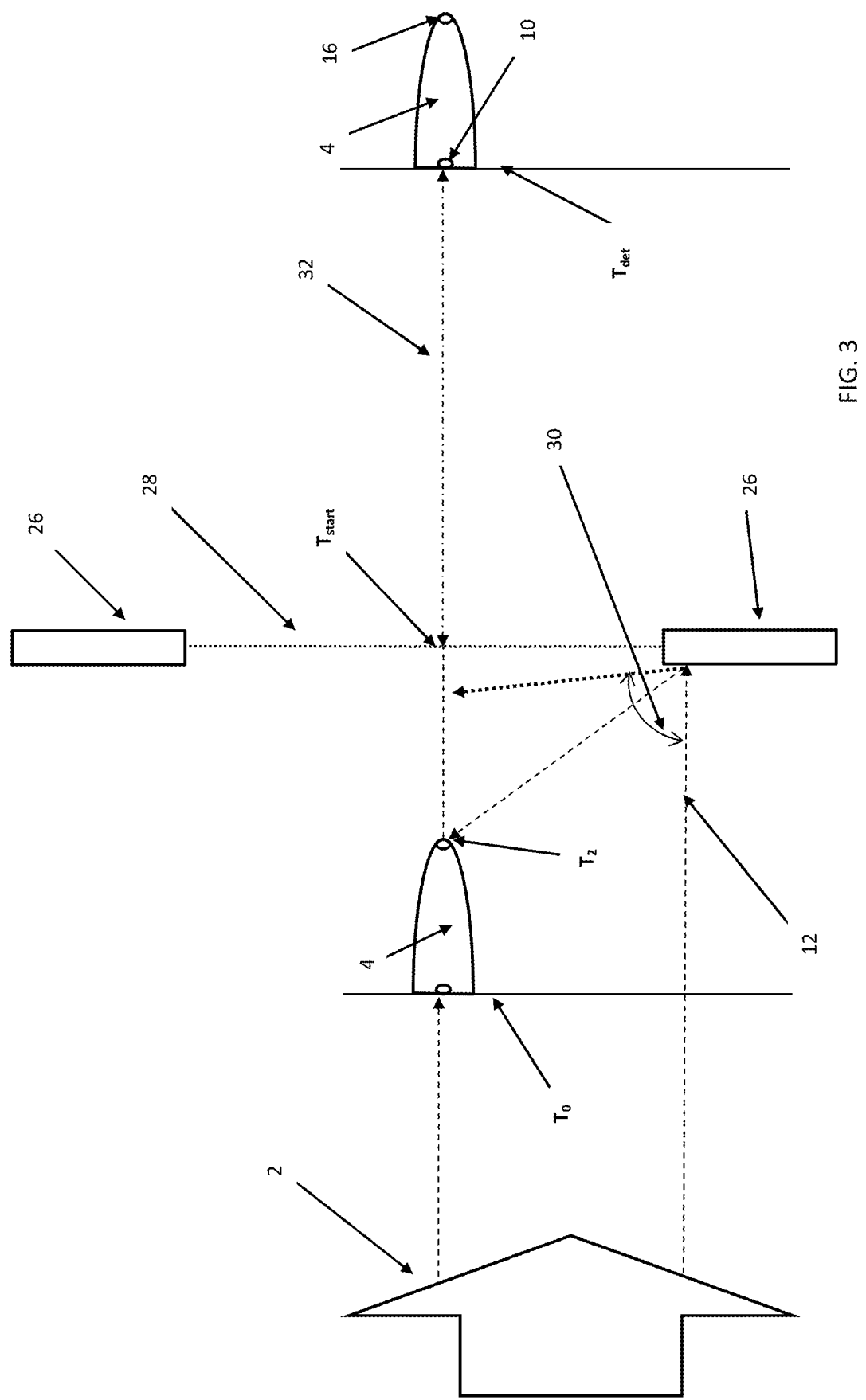
FIG. 3 illustrates one embodiment of the system and method of the present disclosure for establishing a time zero for the time delayed detonation of a projectile.

Referring to FIG. 3, one embodiment of the system and method of the present disclosure for establishing a start time for the time delayed detonation of a projectile is shown. More specifically, using a fiber laser generating high pulse repetition frequency signals (PRF) 2, a fire control system (not shown) can paint both the projection for azimuth (Az) and elevation (El) tracking information for a munition 4, and an exterior surface of a structure 26, or target. In one embodiment, a PIN diode is placed on both the front and rear of the projectile 4 and they are used to determine the position of the exterior surface of a structure 26, or building, relative to the projectile 4.

In certain embodiments, an antenna array having multiple antenna elements is located on the front face 16 of the projectile 4 and the array is used to more accurately measure the angle (θ) from the center line of the projectile 32 to the structure 26, theta-dot (angular velocity), or both. In the case of a simple PIN diode looking forward, the lateral offset is not directly known by the round. By coupling round velocity (either estimated or measured) the lateral offset can be estimated and included in the range or time-to-go determination. The front looking detector or imager allows the projectile 4 to measure the Theta angle θ between the projectile 4 and the target that when coupled with the range-to-go measurement allows direct measurement of the lateral offset and range-to-go. Theta-dot can also be used as a threshold measurement for command detonation depending on the warhead type and weapon speed.

Additionally, the range-to-go can be determined using the time delay 12. Once an accurate position is determined the fuse can set a delay corresponding to the amount of penetration into the structure 26 such as an opening or window that is defined by two opposing structures 26. In some cases, the detection of the change in the angle of the reflected radiation 30 is detected by the detector on the nose of the projectile 16 periodically. In some cases, when this angle reaches a limit (e.g., perpendicular to the direction of travel of the projectile) a time to detonation clock is started ($T_{start}$).

Still referring to FIG. 3, a plane 28 is defined by the location where a projectile would pass from outside a structure, or building to inside a structure, or building. In some cases, the plane may be co-located with a window or the like. At the point, $T_{start}$, where the projectile crosses the plane 28 a time to detonation clock is started. In some cases, a certain amount of time 32 can be added to $T_{start}$ to arrive at $T_{det}$ (for the time to detonate). This provides for the proper penetration into a building or structure 26 prior to detonation and this offset value depends on several factors, including, but not limited to, the blast pattern for a particular munition, the type of structure, the speed of the munition, and the like.

Most conventional systems use a range-to-target determined by the fire control system, which may be off by several meters. The system and method of the present disclosure is determined on the munition in real-time, and thus has no latency issues and is highly accurate. In some cases, the accuracy is less than about 0.2 meters.

Figure 4:
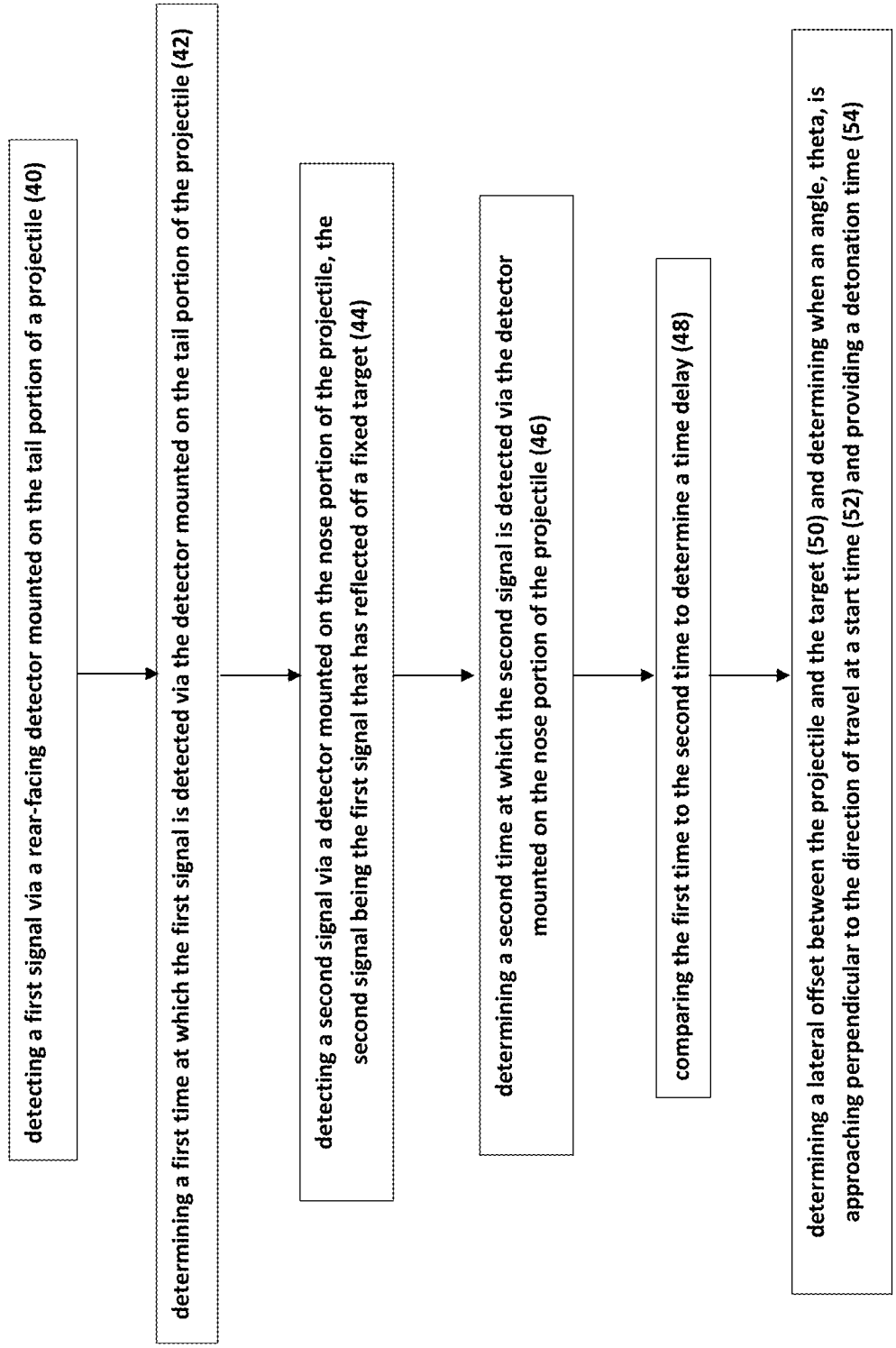
FIG. 4 shows a flowchart of one embodiment of a method according to the principles of the present disclosure.

Referring to FIG. 4, a flowchart of one embodiment of a method according to the principles of the present disclosure is shown. More specifically, the system detects a first laser or radio frequency signal via a rear-facing detector mounted on the tail portion of a projectile (40) and determines a first time at which the first laser or radio frequency signal is detected via the detector mounted on the tail portion of the projectile (42). The system detects a second laser or radio frequency signal via a detector mounted on the nose portion of the projectile, the second laser or radio frequency signal being the first laser or radio frequency signal that has reflected off a fixed target (44) and determines a second time at which the second laser or radio frequency signal is detected via the detector mounted on the nose portion of the projectile (46). The system compares the first time and the second time to determine a time delay (48). Next, by determining a lateral offset between the projectile and the target (50) and determining when an angle, theta, is approaching perpendicular to the direction of travel of the projectile at a start time (52). By providing a detonation sometime after the start time (54) controlled detonation can be achieved, particularly when the detonation is to occur in the interior of a fixed target.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method for controlling detonation, comprising:
   providing a projectile comprising a tail portion and a front portion;
   detecting a first signal via a tail detector mounted proximate the tail portion of the projectile;
   determining a first time at which the first signal is detected via the tail detector mounted on the tail portion of the projectile;
   detecting a second signal via a front detector mounted on the front portion of the projectile, the second signal being the first signal that has reflected off a fixed target;
   determining a second time at which the second signal is detected via the front detector mounted on the front portion of the projectile;
   comparing the first time to the second time to determine a time delay;
   determining a lateral offset between the projectile and the fixed target;
   determining when an angle, theta, is approaching perpendicular to the direction of travel of the projectile at a start time ($T_{start}$), wherein the angle represents the detection of a signal by the front detector that has reflected off the fixed target; and
   providing a time-to-detonate ($T_{det}$) thereby accurately controlling detonation for the projectile to occur at some point after the projectile enters an interior of the fixed target.

2. The method for controlling detonation according to claim 1, wherein the tail detector on the tail of the projectile is an electro-optical PIN diode or a radio frequency antenna.

3. The method for controlling detonation according to claim 1, wherein the front detector on the front of the projectile is an array PIN diode.

4. The method for controlling detonation according to claim 1, wherein a range finding clock is started when the first signal is detected ($T_{zero}$) by the tail detector on the tail of the projectile and the range finding clock is stopped when the second signal is detected by the front detector on the front of the projectile ($T_{reflected}$), thereby creating a time differential that represents a round trip time between the projectile and the target which can be converted to a range-to-go.

5. The method for controlling detonation according to claim 4, wherein a time to detonation clock is started when the signal is detected by the front detector on the front of the projectile at a time ($T_{start}$) when an angle, theta, is approximately perpendicular to the projectile's direction of travel as the signal is reflected off the fixed target.

6. The method for controlling detonation according to claim 5, wherein the time to detonation clock is stopped and the projectile is detonated at a time point ($T_{det}$) representing when the projectile is some distance inside the interior of the fixed target.

7. The method for controlling detonation according to claim 6, wherein the detonation time point ($T_{det}$) determination is dependent on the projectile speed, the type of structure, and the particular projectile.

8. The method for controlling detonation according to claim 7, wherein the detonation time point is programmed at the time of launch.

9. The method for controlling detonation according to claim 1, wherein the first signal further comprises a first pulse repetition interval and the second signal further comprises a second pulse repetition interval.

10. The method for controlling detonation according to claim 9, wherein the lateral offset between the projectile's trajectory and the target's actual position is determined by measuring a time expansion between the first pulse repetition interval and the second pulse repetition interval and convolving the projectile's velocity with the time-to-go thereby improving an accuracy of a detonation.

11. The method for controlling detonation according to claim 1, wherein determining a lateral offset uses the time delay between detection by the first detector and detection by the second detector.

12. A guided munition, comprising;
a tail detector located on a tail portion of the guided munition for detecting a laser pulse and/or RF pulse signal;
a front detector mounted on the front portion of the guided munition and detecting a reflected signal from a target;
a computer readable storage device having instructions, which when executed by a processor, cause the processor to execute:
determining a first time at which the laser pulse and/or RF pulse signal is detected via the tail detector;
determining a second time at which the reflected signal is detected via the front detector mounted on the front portion of the guided munition;
comparing the first time to the second time to determine a time delay;
determining a lateral offset between the guided munition and the target using the time delay;
determining a detonation start time when the guided munition is approximately perpendicular to the target; and
providing a time-to-detonate to occur which is after the detonation start time.

13. The guided munition according to claim 12, wherein the tail detector is an electro-optical PIN diode or a radio frequency antenna.

14. The guided munition according to claim 12, wherein the front detector is an array PIN diode.

15. The guided munition according to claim 12, wherein the front detector is a nose of the guided munition.

* * * * *